United States Patent
Gill et al.

(10) Patent No.: US 9,957,862 B2
(45) Date of Patent: May 1, 2018

(54) SECONDARY HEATING DEVICE FOR DIESEL EXHAUST FLUID TANK

(71) Applicant: Robert Bosch GmbH, Stuttgart (DE)

(72) Inventors: Preetinder Gill, Farmington Hills, MI (US); Amar Shah, Farmington Hills, MI (US)

(73) Assignee: Robert Bosch GmbH, Stuttgart (DE)

(*) Notice: Subject to any disclaimer, the term of this patent is extended or adjusted under 35 U.S.C. 154(b) by 501 days.

(21) Appl. No.: 14/667,029

(22) Filed: Mar. 24, 2015

(65) Prior Publication Data

US 2015/0285113 A1    Oct. 8, 2015

Related U.S. Application Data

(60) Provisional application No. 61/974,498, filed on Apr. 3, 2014.

(51) Int. Cl.
*F24H 9/12* (2006.01)
*F01N 3/035* (2006.01)
(Continued)

(52) U.S. Cl.
CPC ............... *F01N 3/035* (2013.01); *B60R 16/00* (2013.01); *F01N 3/0253* (2013.01); *F01N 3/36* (2013.01);
(Continued)

(58) Field of Classification Search
CPC ................. F01N 3/035; F01N 2610/02; F01N 2610/1406; F01N 2610/1486
(Continued)

(56) References Cited

U.S. PATENT DOCUMENTS 2,743,348 A * 4/1956 Boyajean ............... B44B 3/063
                                                                 219/229
6,043,468 A * 3/2000 Toya ....................... C30B 15/14
                                                                 219/544
(Continued)

FOREIGN PATENT DOCUMENTS

DE   202006010615   10/2006
DE   102006019050   10/2007
(Continued)

OTHER PUBLICATIONS

European Search Report for EP Appl. 15162050.7 dated Sep. 2, 2015, 5 pages.

*Primary Examiner* — Thien S Tran
(74) *Attorney, Agent, or Firm* — Michael Best & Friedrich LLP (57) ABSTRACT

A spindle assembly of a secondary heater for a diesel exhaust fluid tank having a primary heater, the spindle assembly including a spindle having a first end and a second end opposite the first end, the first end and the second end defining a central axis therebetween, the spindle defining a plurality of grooves arranged between the first end and the second end. The spindle assembly includes a retaining pin coupled to the spindle, the retaining pin extending generally parallel to the central axis. The spindle assembly further includes an attachment mechanism coupled to the second end, the attachment mechanism configured to couple the spindle to an inner surface of the diesel exhaust fluid tank. The spindle and the retaining pin are configured to secure a heating wire within the plurality of grooves between the retaining pin and the central axis.

20 Claims, 6 Drawing Sheets

(51) Int. Cl.
    *B60R 16/00*     (2006.01)
    *H05B 3/82*     (2006.01)
    *F01N 3/36*     (2006.01)
    *F01N 3/025*     (2006.01)

(52) U.S. Cl.
    CPC ............ *H05B 3/82* (2013.01); *F01N 2240/16* (2013.01); *F01N 2610/02* (2013.01); *F01N 2610/03* (2013.01); *F01N 2610/1406* (2013.01); *F01N 2610/1486* (2013.01)

(58) Field of Classification Search
    USPC ............... 219/214, 260, 385, 523, 544, 600; 220/562, 564
    See application file for complete search history.

(56) References Cited

U.S. PATENT DOCUMENTS

| | | | |
|---|---|---|---|
| 6,732,450 B1 * | 5/2004 | Chen | A45D 20/12 338/282 |
| 6,739,126 B2 | 5/2004 | Huthwohl | |
| 7,712,304 B2 | 5/2010 | Mayer et al. | |
| 7,912,360 B2 | 3/2011 | Gschwind | |
| 8,258,234 B2 | 9/2012 | Lohmeijer et al. | |
| 8,586,895 B2 | 11/2013 | Haeberer et al. | |
| 8,919,370 B2 | 12/2014 | Krause et al. | |
| 2004/0115110 A1 | 6/2004 | Ripper et al. | |
| 2007/0157602 A1 * | 7/2007 | Gschwind | B60K 15/00 60/274 |
| 2009/0065508 A1 | 3/2009 | Haeberer et al. | |
| 2010/0199647 A1 | 8/2010 | Cruz et al. | |
| 2011/0120102 A1 | 5/2011 | Hafner et al. | |
| 2011/0120984 A1 | 5/2011 | Cook et al. | |
| 2011/0138791 A1 | 6/2011 | Li et al. | |
| 2012/0006832 A1 | 1/2012 | Krause et al. | |
| 2013/0255234 A1 | 10/2013 | Bauer et al. | |
| 2013/0318950 A1 | 12/2013 | Gottwald | |
| 2013/0334077 A1 * | 12/2013 | Van Schaftingen | F01N 3/2066 206/216 |

FOREIGN PATENT DOCUMENTS

| | | |
|---|---|---|
| DE | 102007041524 A1 | 3/2009 |
| DE | 102007060774 A1 | 6/2009 |
| DE | 102008041903 A1 | 3/2010 |
| DE | 102009002209 A1 | 10/2010 |
| DE | 102009028113 A1 | 2/2011 |
| DE | 102009045721 A1 | 4/2011 |
| DE | 102009045725 A1 | 4/2011 |
| DE | 102009047058 A1 | 5/2011 |
| DE | 102009047334 A1 | 6/2011 |
| DE | 102009047647 A1 | 6/2011 |
| DE | 102010001745 A1 | 8/2011 |
| DE | 102010028440 A1 | 11/2011 |
| DE | 102010029269 A1 | 12/2011 |
| DE | 102010063002 A1 | 6/2012 |
| DE | 102013200445 A1 | 8/2013 |
| EP | 2093397 A1 | 8/2009 |
| EP | 2400125 A1 | 12/2011 |
| FR | 2858812 A1 | 2/2005 |
| KR | 100984312 | 10/2010 |
| WO | 2008040592 A1 | 4/2008 |
| WO | 2009053176 A1 | 4/2009 |
| WO | 2010035355 A1 | 4/2010 |
| WO | 2010046152 A1 | 4/2010 |
| WO | 2010078990 A1 | 7/2010 |
| WO | 2011151229 A1 | 12/2011 |
| WO | 2012095260 A1 | 7/2012 |
| WO | 2012130493 A1 | 10/2012 |
| WO | 2012152498 A1 | 11/2012 |
| WO | 2013087663 A1 | 6/2013 |

* cited by examiner

*FIG. 10*

SECONDARY HEATING DEVICE FOR DIESEL EXHAUST FLUID TANK

CROSS-REFERENCE TO RELATED APPLICATIONS

This application claims priority to U.S. Provisional Patent Application No. 61/974,498, filed Apr. 3, 2014, the entire contents of which are hereby incorporated by reference.

BACKGROUND

The present invention relates to diesel exhaust fluid (DEF) tanks on vehicles. These tanks contain an aqueous solution that is injected into an exhaust gas stream to help with a subsequent selective catalytic reaction.

SUMMARY

In one aspect, the invention provides a spindle assembly of a secondary heater for a diesel exhaust fluid tank having a primary heater. The spindle assembly includes a spindle having a first end and a second end opposite the first end. The first end and the second end define a central axis therebetween. Further, the spindle defines a plurality of grooves arranged between the first end and the second end. The spindle assembly further includes a retaining pin coupled to the spindle, the retaining pin extending generally parallel to the central axis. An attachment mechanism is coupled to the second end. The attachment mechanism is configured to couple the spindle to an inner surface of the diesel exhaust fluid tank. Further, the spindle and the retaining pin are configured to secure a heating wire within the plurality of grooves between the retaining pin and the central axis.

In another aspect, the invention provides a secondary heater assembly for a diesel exhaust fluid tank having a primary heater. The secondary heater assembly includes a heating wire and a plurality of spindle assemblies. Each of the plurality of spindle assemblies has a spindle with a first end and a second end opposite the first end, the first end and the second end defining a central axis therebetween. Further, the spindle defines a plurality of grooves arranged between the first end and the second end. Each of the plurality of spindle assemblies further includes a retaining pin coupled to the spindle, the retaining pin extending generally parallel to the central axis. An attachment mechanism is coupled to the second end, the attachment mechanism configured to couple the spindle to an inner surface of the diesel exhaust fluid tank. The heating wire is coupled to the plurality of spindle assemblies by securing at least a portion of the heating wire to each of the plurality of spindle assemblies between the retaining pin and the central axis.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
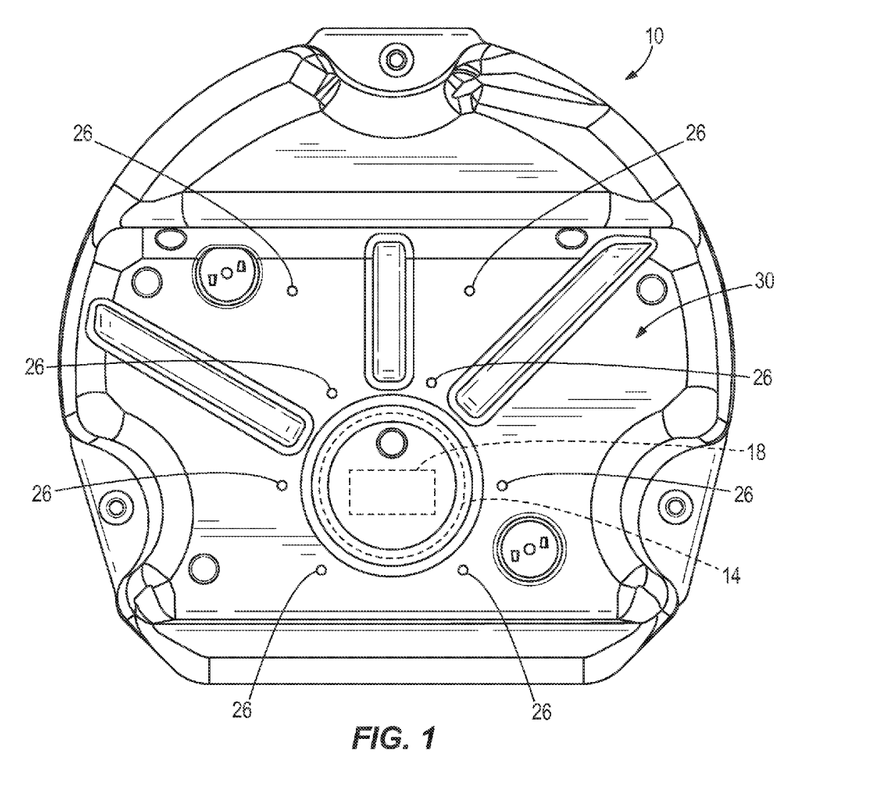
FIG. 1 is a top view of a bottom half of a diesel exhaust fluid tank.

FIG. 1 illustrates a bottom half of a two-part diesel exhaust fluid (DEF) tank 10. The DEF tank 10 is a single piece of plastic (e.g. high density polyethylene), preferably made from blow molding. In other embodiments, the DEF tank 10 may include of two or more parts made by injection molding. The two or more injection molded parts may be secured together (e.g. by welding) to complete the DEF tank 10. The DEF tank 10 includes a heater pot 14 enclosing a primary heater 18. The primary heater 18 is coupled to a first power supply (not shown) for powering the primary heater 18. The DEF tank 10 holds diesel exhaust fluid, and defines a plurality of fixation locations 26 on an inner surface 30 of the DEF tank 10. A second power supply (not shown) powers a secondary heater (not shown in FIG. 1).

Spindle assemblies 38 (see, e.g. FIG. 2) are coupled to the inner surface 30 of the DEF tank 10 at the fixation locations 26. The spindle assemblies 38 provide support to a heating wire 42, which is secured to the spindle assemblies 38. The secondary heater includes the spindle assemblies 38 and the heating wire 42. The heating wire 42 exits and enters the DEF tank 10 through openings defined in the outer surface of the heater pot 14 (see FIG. 1). The second power supply powers the secondary heater by producing a current though the heating wire 42.

The fixation locations 26 are arranged on the inner surface 30 of the DEF tank 10 and are locations where the inner surface 30 is configured to couple to one of the spindle assemblies 38. The fixation locations 26 are arranged such that the heating wire 42, once secured to the spindle assemblies 38, assists the primary heater 18 in providing uniform heating throughout the DEF tank 10. The fixation locations 26 may be chosen based on the structure and configuration of the DEF tank 10, the location of the primary heater 18 in the DEF tank 10, the expected current from the second power supply, and similar factors. In FIG. 1 the fixation locations 26 are on a bottom inner surface 30 of the DEF tank 10. In other constructions, the fixation locations 26 may be on a top inner surface of the DEF tank 10 and/or on side inner surfaces of the DEF tank 10, in addition to, or instead of, the fixation locations 26 located on the bottom inner surface 30 of the DEF tank 10. Further, there may be fewer or more fixation locations 26 and corresponding spindle assemblies 38, as required to heat the diesel exhaust fluid.

Figure 2:
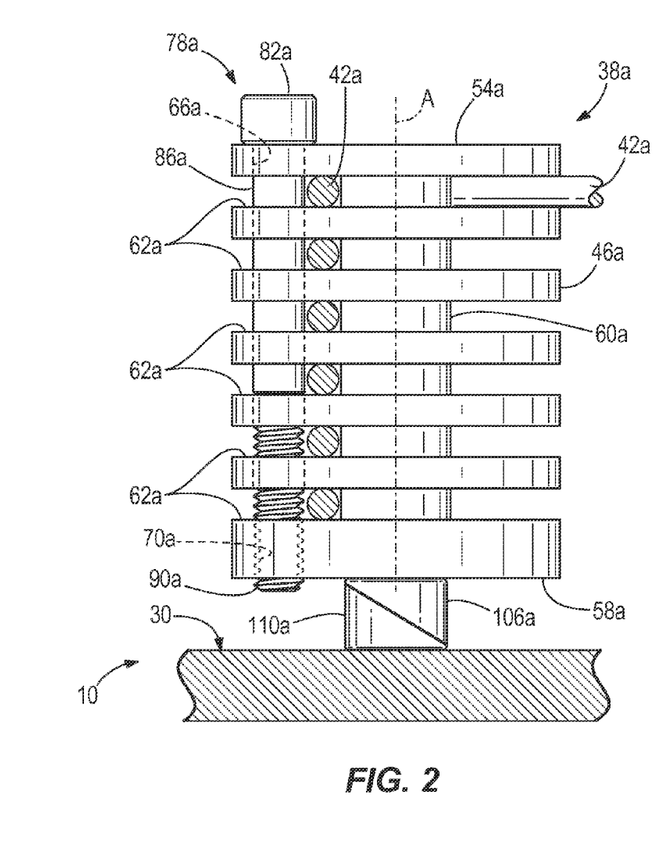
FIG. 2 is a side view of a spindle assembly.

FIG. 2 illustrates an embodiment of a spindle assembly 38a. The spindle assembly 38a includes a spindle 46a that is generally cylindrically shaped with a first end 54a at a location farthest from the inner surface 30 of the DEF tank 10. A second end 58a of the spindle 46a is at a location closest to the inner surface 30 of the DEF tank 10. The second end 58a is opposite the first end 54a. The spindle 46a is generally made of a nonconductive material that is non-reactive with the diesel exhaust fluid (e.g. nylon). The first end 54a and the second end 58a define a central axis A between them. The central axis A is arranged generally perpendicular to the inner surface 30 of the DEF tank 10 and passes through a central post portion 60a of the spindle 46a. In other constructions, the central axis A may form a non-perpendicular angle relative to the inner surface 30 of the DEF tank 10. The spindle 46a defines a plurality of grooves 62a (e.g. 6) or cutouts which are spaced apart from each other along a direction parallel the central axis A. In other embodiments, other numbers of groves 62a may be defined by the spindle 46a, for instance, a longer spindle 38a may accommodate more grooves 62a. In the illustrated embodiment, each groove 62a of the plurality of grooves 62a is evenly spaced from the nearest other grooves 62a. In other constructions, the grooves 62a may not be evenly spaced from each other, or only a portion of the plurality of grooves 62a may be evenly spaced from one another. Further, in other embodiments the grooves 62a may be spaced closer or farther apart as needed to accommodate the heating wire 42a.

As shown in FIG. 2, each of the plurality of grooves 62a is parallel to one another. Additionally, each of the plurality of grooves 62a is parallel to the inner surface 30 of the DEF tank 10. Further, each of the plurality of grooves 62a is arranged perpendicular to the central axis A.

The spindle 46a further defines an opening 66a. The opening 66a is arranged parallel the central axis A of the spindle 46a and is spaced from the central axis A. Further, the opening 66a extends from the first end 54a to the second end 58a. Though the body of the spindle 46a are defined each of the grooves 62a. The opening 66a has a threaded section 70a that is located between the groove 62a closest to the second end 58a and the second end 58a. In other embodiments, other sections of the opening 66a may be threaded in addition to, or instead of, the threaded section 70a illustrated in FIG. 2.

Still referring to FIG. 2, a retaining pin 78a is arranged within the opening 66a. The retaining pin 78a is made from a nonconductive material that is nonreactive with diesel exhaust fluid (e.g., nylon). The retaining pin 78a extends from the first end 54a to the second end 58a. The retaining pin 78a has a bolt head 82a and a smooth cylindrical portion 86a along a part of the retaining pin 78a closest to the bolt head 82a. Further, the retaining pin 78a has a threaded end 90a below the smooth cylindrical portion 86a that is mated with the threaded section 70a of the spindle 46a. Mating of the threaded end 90a to the threaded section 70a removably couples the retaining pin 78a to the spindle 46a. The retaining pin 78a extends generally parallel to the central axis A when positioned inside the opening 66a. The retaining pin 78a also extends through each of the grooves 62a of the plurality of grooves 62a.

A heating wire 42a is secured to the spindle assembly 38a within the plurality of grooves 62a between the retaining pin 78a and the central axis A. In other words, the retaining pin 78a and the spindle 46a hold the heating wire 42a within the spindle assembly 38a and prevent the heating wire 42a from falling out of the grooves 62a. In the illustrated construction, the heating wire 42a is secured within each groove 62a of the plurality of grooves 62a. The heating wire 42a can similarly be secured to other spindle assemblies 38a within a DEF tank. For example, the heating wire 42a may be arranged to extend back and forth one or more times between a plurality of spindle assemblies 38a. In this manner, the heating wire 42a may be coupled to each of the plurality of spindle assemblies 38a by having a portion of the heating wire 42a secured to each of the plurality of spindle assemblies 38a between their respective retaining pins 78a and central axes A. In further constructions additional heating wires are utilized and heated by the second power supply. Further, in other constructions the additional heating wires are heated by a separate power source.

The spindle assembly 38a further includes an attachment mechanism. As shown schematically in FIG. 2, the attachment mechanism is a sliding locking tab 106a. The sliding locking tab 106a couples to the second end 58a of the spindle 46a to the inner surface 30. In the illustrated construction, the sliding locking tab 106a is integrally formed on the spindle 46a. In other constructions, the sliding locking tab 106a is a separate component from the spindle 46a.

The sliding locking tab 106a mates with a corresponding component 110a installed on the inner surface 30 of the DEF tank 10. The corresponding components 110a are located at the fixation locations 26 described above in regard to FIG. 1. In some alternative constructions, the corresponding components 110a are integrally formed with the DEF tank 10 during an injection molding process. The sliding locking tab 106a and the corresponding component 110a will be described in more detail below.

Figure 3:
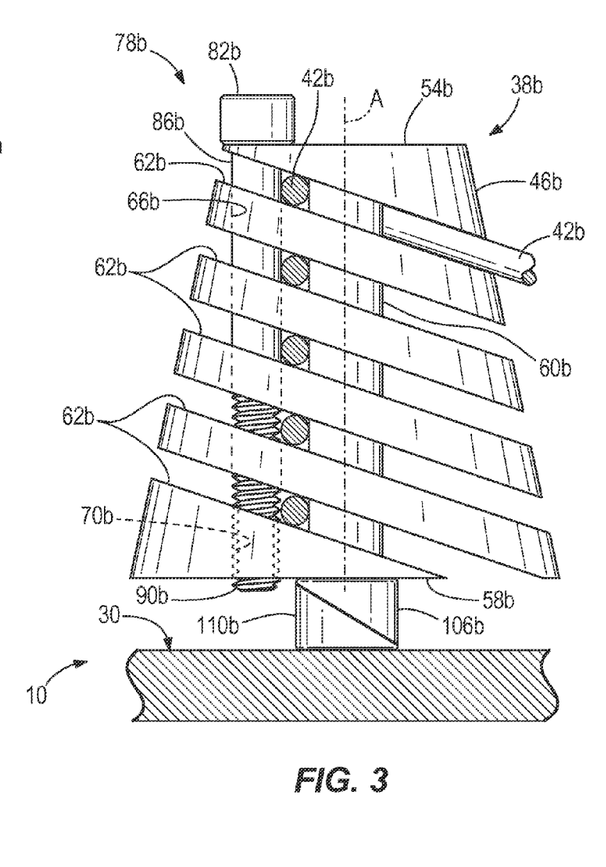
FIG. 3 is a side view of a spindle assembly according to another embodiment of the invention.

FIG. 3 illustrates another embodiment of a spindle assembly 38. The spindle assembly 38b has a spindle 46b that is substantially frustum shaped. Similar to the embodiment in FIG. 2, the spindle 46b has a top end 54b and a bottom end 58b. The top end 54b and the bottom end 58b define a central axis A within a central post portion 60b. The spindle 46b defines a plurality of grooves 62b and an opening 66b extending from the first end 54b to the second end 58b. The opening 66b has threaded section 70b. Each of the plurality of grooves 62b is arranged at an oblique angle relative to the central axis A. A retaining pin 78b extends from the top end 54b to the bottom end 58b and includes a bolt head 82b, a smooth cylindrical portion 86b, and a threaded end 90b. When inserted in the opening 66b, the retaining pin 78b extends through the plurality of grooves 62b. A sliding locking tab 106b is integrally formed on the second end 58b of the spindle 46b and couples the spindle assembly 38b to a corresponding component 110b on the inner surface 30. Further, a heating wire 42b is secured within each groove 62b of the plurality of grooves 62b by virtue of being sandwiched between the retaining pin 78b and the central post portion 60b (i.e., between the retaining pin 78a and the central axis A).

Figure 4:
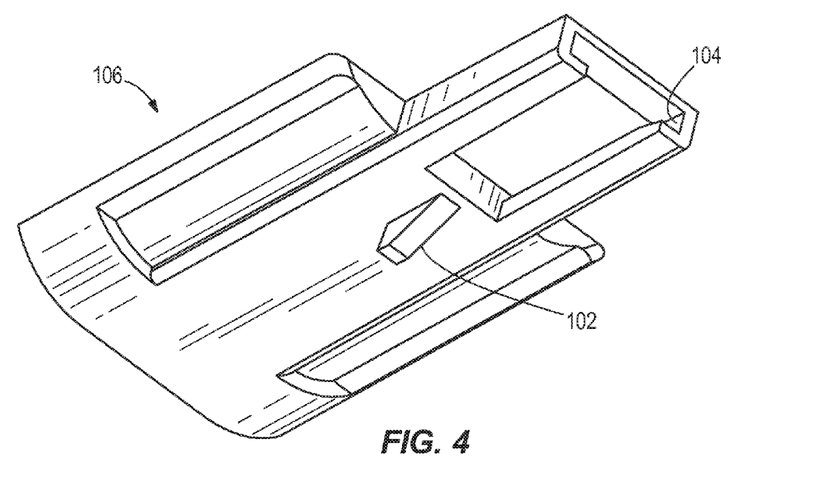
FIG. 4 is a perspective view of a sliding locking tab.
Figure 5:
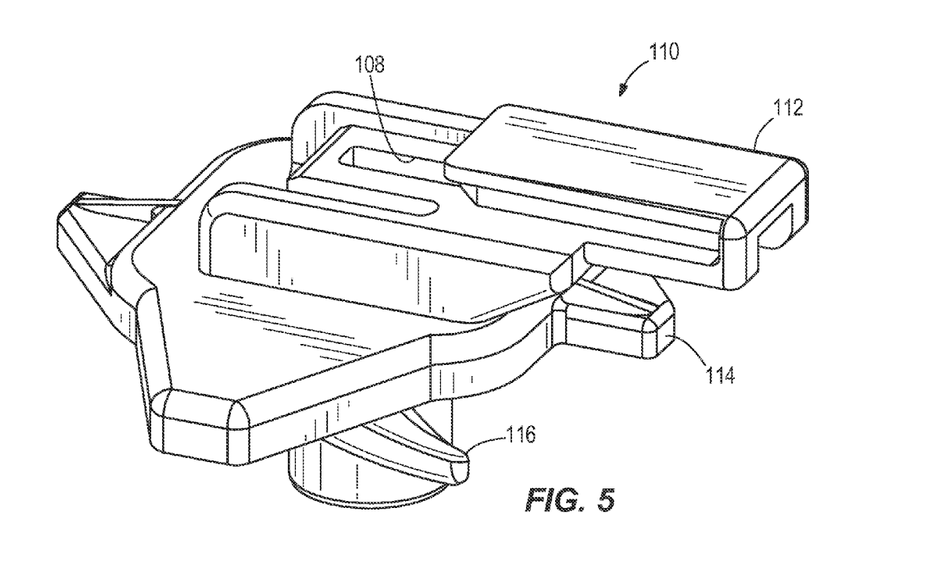
FIG. 5 is a perspective view of a mating component to the sliding locking tab of FIG. 4.
Figure 6:
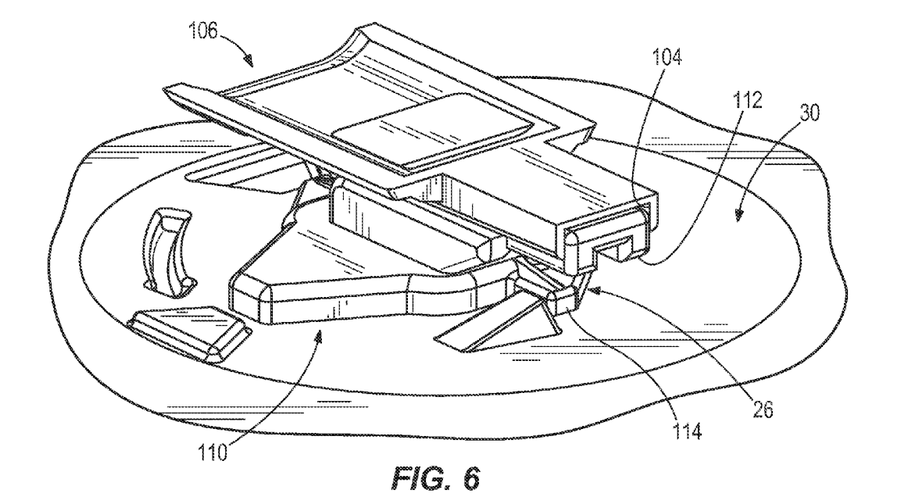
FIG. 6 is a perspective view of the sliding locking tab of FIG. 4 mated with the component of FIG. 5.
Figure 7:
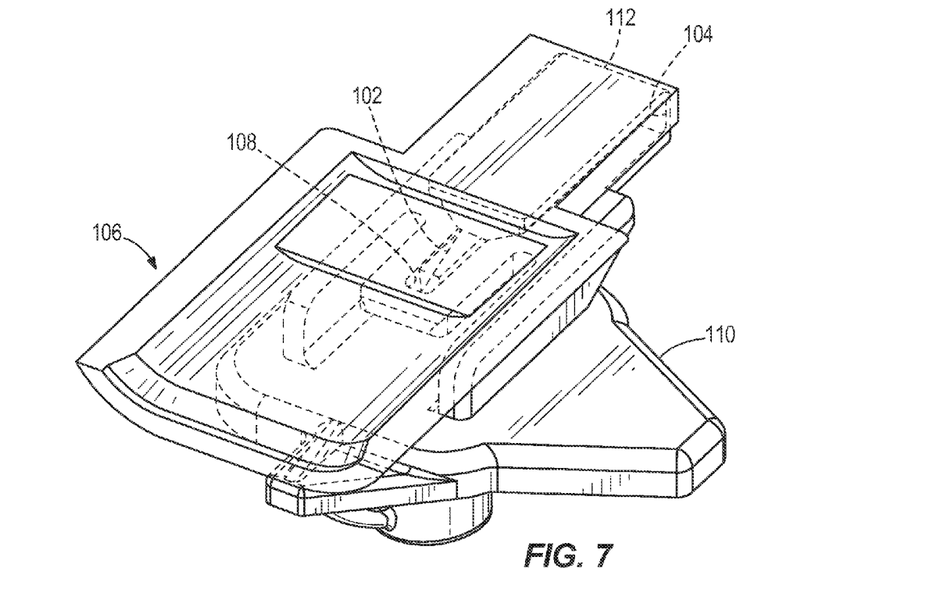
FIG. 7 is another a perspective view of the sliding locking tab of FIG. 4 mated with the component of FIG. 5.

Referring to FIG. 4, the sliding locking tab 106 is a plastic component (e.g., nylon) that includes a locking pawl 102 and a groove 104. Referring to FIG. 5, the corresponding component 110 includes a recess 108, a tongue 112, a wing 114, and a protrusion 116. The sliding locking tab 106 and the corresponding component 110 are configured to mate together, as shown in FIGS. 6-7, in order to couple the spindle assembly 38 to the DEF tank 10. In particular, the groove 104 receives the tongue 112, and the recess 108 receives the locking pawl 102, as shown in FIGS. 6-7. Additionally, the corresponding component 110 is rotatably coupled to the inner surface 30 by insertion of the protrusion 116 into a recess in the inner surface 30, and by turning the wing 114 past a ramp on the inner surface 30 (see FIG. 6).

Figure 8:
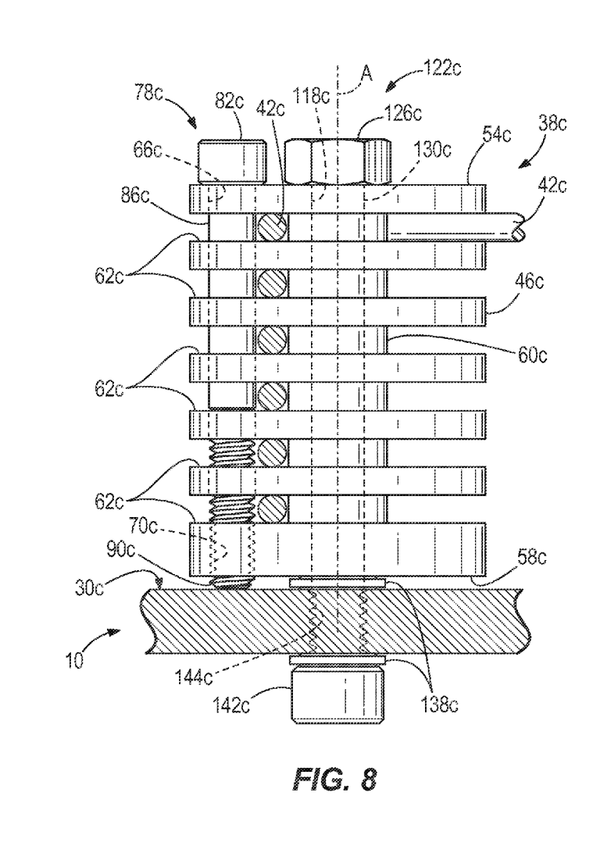
FIG. 8 is a side view of a spindle assembly according to a further embodiment of the invention.
Figure 9:
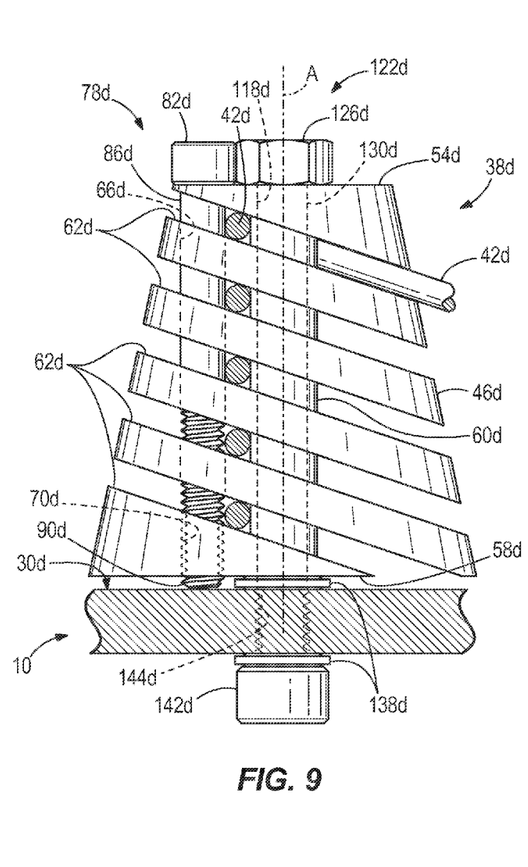
FIG. 9 is a side view of a spindle assembly according to yet another embodiment of the invention.

FIGS. 8-9 illustrate further embodiments of spindle assemblies 38. In particular, the embodiments in FIGS. 8-9 couple to the inner surface 30 by means of a nut and bolt arrangement instead of by use of the sliding locking tab 106 and corresponding component 110 shown in FIGS. 2-3. Similar to the embodiments shown in FIGS. 2-3, spindle assemblies 38c-d in FIGS. 8-9 include spindles 46c-d that define openings 66c-d. The openings 66c-d receive retaining pins 78c-d having bolt heads 82c-d, smooth cylindrical portions 86c-d, and threaded ends 90c-d. The spindle assemblies 38c-d further include first ends 54c-d, second ends 58c-d, central axes A, central post portions 60c-d, and pluralities of grooves 62c-d. Further, heating wires 42c-d are secured within each groove 62c-d of the plurality of grooves 62c-d. The spindle 46c in FIG. 8 is generally cylindrical in shape while the spindle 46d is generally frustum or frusto-conically shaped.

The spindle assemblies 38c-d shown in FIGS. 8-9 further define central bores 118c-d. The central bores 118c-d are parallel to the central axis A. The central bores 118c-d also generally encompass the central axis A in the illustrated embodiments. The central bores 118c-d receive a bolt 122c-d made of a material that is nonreactive with diesel exhaust fluid (e.g., stainless steel) which extends from the first end 54c-d to the second end 58c-d. Heads 126c-d of the bolts 122c-d abut the first ends 54c-d of the spindles 46c-d and bodies 130c-d of the bolts 122c-d extend through the central bores 118c-d. The bodies 130c-d of the bolts 122c-d are threaded on ends of the bolts 122c-d farthest from the heads 126c-d of the bolts 122c-d. To accommodate the nut and bolt arrangements, the fixation locations 26 on the inner surface 30 (see FIG. 1) define threaded boreholes 144c-d that receive the ends of the bolts 122c-d.

The bodies 130c-d of the bolts 122c-d extend through a wall of the DEF tank 10. Located between the second ends 58c-d of the spindles 46c-d and the inner surface 30 of the DEF tank 10, first annular sealing washers 138c-d surround the bodies 130c-d of the bolts 122c-d. A second annular sealing washer 138c-d abuts the outer surfaces of the DEF tank 10 and surround the bodies 130c-d of the bolts 122c-d. The annular sealing washers 138c-d are generally made of stainless steel and/or plastic. Nuts 142c-d (made of stainless steel, for example) are secured along the bodies 130c-d of the bolts 122c-d and abut the second annular sealing washers 138c-d. The first annular sealing washer and second annular sealing washers 138c-d prevent diesel exhaust fluid from leaking out of the threaded boreholes 144c-d in the wall of the DEF tank 10 when the spindle assemblies 38c-d are coupled to the DEF tank 10.

Figure 10:
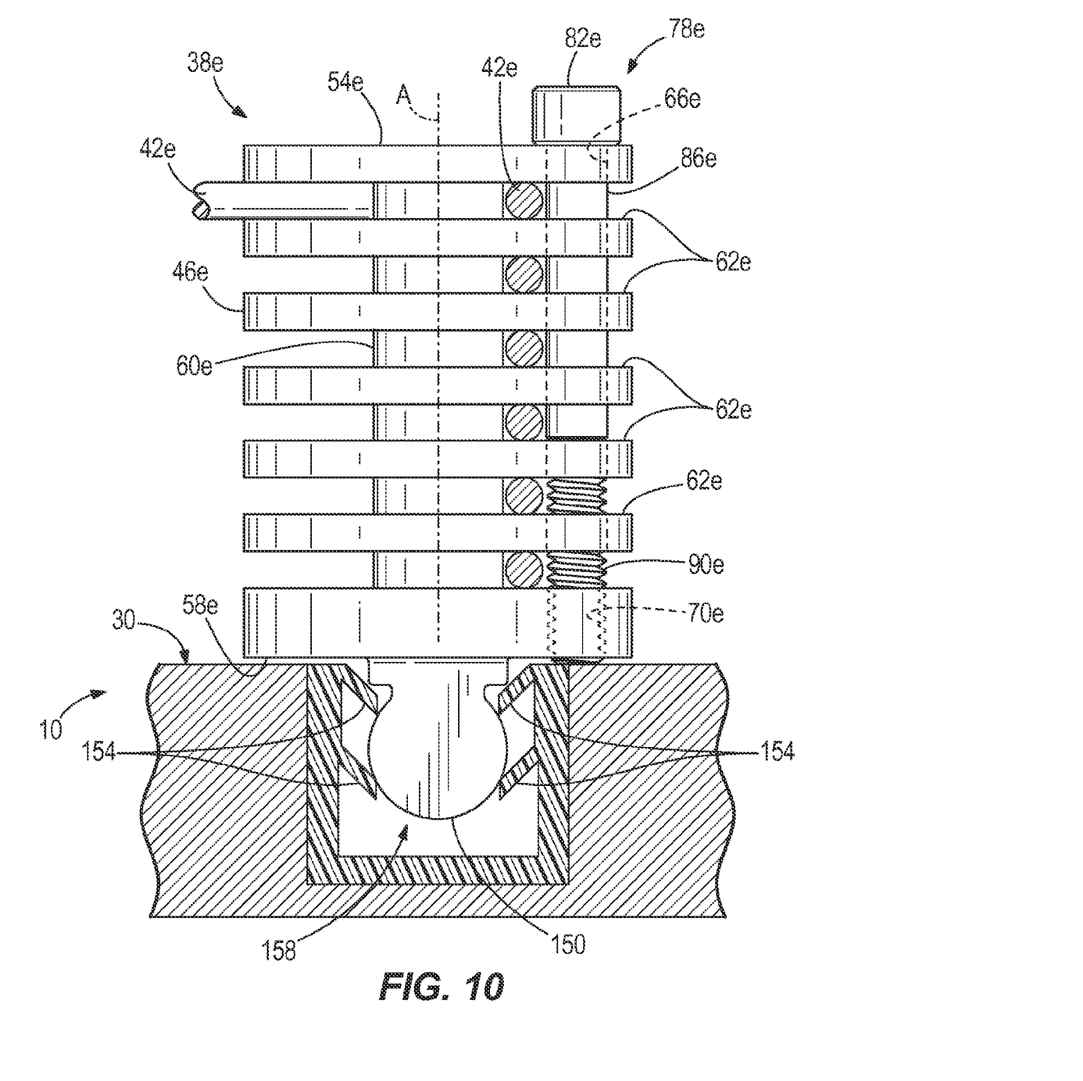
FIG. 10 is a side view of a spindle assembly according to another embodiment of the invention.

FIG. 10 illustrates another embodiment of a spindle assembly 38. In particular, the embodiment in FIG. 10 couples to the inner surface 30 of the DEF tank 10 by means of an attachment body 150. Similar to the embodiments shown in FIGS. 2-3 and 8-9, spindle assembly 38e in FIG. 10 includes a spindle 46e that defines an opening 66e that receives a retaining pin 78e. The retaining pin 78e has a bolt head 82e, a smooth cylindrical portion 86e, and a threaded end 90e. The spindle 46e further includes a first end 54e, a second end 58e, a central axis A running through a central post portion 60e, and a plurality of grooves 62e. A heating wire 42e is secured within one or more of the grooves 62e of the plurality of grooves 62e. The spindle 46e in FIG. 10 is generally cylindrical in shape, however, in other constructions the spindle 46e has a different shape (e.g., is generally frustum or frusto-conically shaped).

The attachment body 150, as illustrated in FIG. 10, is generally cylindrically shaped. Further, the attachment body 150 is integrally formed on the spindle 46e. In other constructions, the attachment body is a different shape (e.g., a sphere, a rectangular prism). Further, in other constructions the attachment body 150 is not integrally formed on the spindle 46e. The attachment body 150 mates with teeth 154 that are integrally formed in a cavity 158 of the DEF tank 10. A portion of the teeth 154 (e.g. 2 teeth) once mated with the attachment body 150, abut the attachment body 150 above the mid-line of the circular cross section of the attachment body 150 relative to the second end 58e to secure the spindle 46e to the DEF tank 10 by securing the attachment body 150 within the cavity 158. Further, a portion of the teeth 154 (e.g. 2 teeth) once mated with the attachment body 150, abut the attachment body 150 below the mid-line of the circular cross section of the attachment body 150 relative to the second end 58e. In other constructions, fewer or more teeth 154 are utilized. Further, in other constructions, the teeth 154 need not be recessed in a cavity 158 in the inner surface 30, but rather could be formed in or on a projection that protrudes upwardly toward the top of the DEF tank 10. In such an embodiment, the teeth 154 may be integrally formed with the DEF tank 10, and would still be considered as being part of or formed on the inner surface 30 of the tank 10.

In some constructions, the secondary heater system may include spindle assemblies 38 having a combination of attachment mechanisms and/or spindle shapes. For example, the secondary heater system may have one or more spindle assemblies 38 with a sliding locking tab attachment mechanism, one or more spindle assemblies 38 that couple to the DEF tank 10 by use of the nut and the bolt arrangement, and one or more spindle assemblies that couple to the DEF tank 10 using the attachment body 150. Further, one or more of the spindles 46 of the spindle assemblies 38 may be generally cylindrical in shape while one or more of the spindles 46 may be generally frustum or frusto-conically shaped. Additionally, other spindle shapes can also be utilized.

In operation, the secondary heater heats the diesel exhaust fluid as the power supply produces a current through the heating wire 42. The heat from the heating wire 42 is absorbed by the diesel exhaust fluid along the length of the heating wire 42 in the DEF tank 10. Generally, the secondary heater is operated in conjunction with the primary heater 18. In other constructions, the secondary heater is operated without operating the primary heater 18.

In the illustrated embodiment, the DEF tank 10 is made by blow molding. Therefore, the DEF tank 10 may only have a small orifice for a user to insert the spindle assemblies 38 in the DEF tank 10 after construction of the DEF tank 10. If a fixation location 26 has a corresponding component 110 on the inner surface 30 of the DEF tank 10, a spindle assembly 38 with a sliding locking tab 106 is mated to the corresponding component 110 by sliding the spindle assembly 38 and sliding locking tab 106 into the corresponding component 110 in a direction generally perpendicular the central axis A. If a particular fixation location 26 has a threaded borehole 144c-d for receiving a nut 142c-d and bolt 122c-d, the spindle assemblies 38 are bolted onto the DEF tank 10 once the spindle assembly 38 is inserted into the orifice. Further, if the fixation location 26 has teeth 154 and a cavity 158, a spindle assembly 38 with an attachment body 150 is inserted into the cavity 158 to lock the spindle 38 in place against the DEF tank 10.

Once the spindles 46 are coupled to the DEF tank, the heating wire 42 is then wrapped around the spindles 46 and secured to the spindles 46 by inserting the retaining pins 78 into the openings 66. If the spindles 46 are generally frustum shaped, it may be easier for a user to wrap a heating wire 42 around the spindle 46 (i.e., the frustum shape is ergonomic).

The embodiments described above and illustrated in the figures are presented by way of example only and are not intended as a limitation upon the concepts and principles of the present invention. As such, it will be appreciated that various changes in the elements and their configuration and arrangement are possible without departing from the spirit and scope of the present invention.

What is claimed is:

1. A spindle assembly of a secondary heater for a diesel exhaust fluid tank having a primary heater, the spindle assembly comprising:
   a spindle having a first end and a second end opposite the first end, the first end and the second end defining a central axis therebetween, the spindle defining a plurality of grooves arranged between the first end and the second end;
   a retaining pin coupled to the spindle, the retaining pin extending generally parallel to the central axis; and
   an attachment mechanism coupled to the second end, the attachment mechanism configured to couple the spindle to an inner surface of the diesel exhaust fluid tank,
   wherein the spindle and the retaining pin are configured to secure a heating wire within the plurality of grooves between the retaining pin and the central axis.

2. The spindle assembly of claim 1, wherein the spindle is substantially cylindrically shaped.

3. The spindle assembly of claim 1, wherein the spindle is substantially frustum shaped.

4. The spindle assembly of claim 1, wherein each of the plurality of grooves is parallel to one another.

5. The spindle assembly of claim 4, wherein each of the plurality of grooves is arranged perpendicular to the central axis.

6. The spindle assembly of claim 4, wherein each of the plurality of grooves is arranged at an oblique angle relative to the central axis.

7. The spindle assembly of claim 1, wherein the spindle further defines an opening and wherein the retaining pin is received within the opening.

8. The spindle assembly of claim 7, wherein the opening is arranged parallel to the central axis.

9. The spindle assembly of claim 1, wherein the retaining pin is removably coupled to the spindle.

10. The spindle assembly of claim 1, wherein the retaining pin includes a threaded portion that mates with a threaded section of the spindle.

11. The spindle assembly of claim 1, wherein the retaining pin extends from the first end to the second end.

12. The spindle assembly of claim 1, wherein the retaining pin extends through each groove of the plurality of grooves.

13. The spindle assembly of claim 1, wherein the attachment mechanism includes a nut and a bolt.

14. The spindle assembly of claim 13, wherein the attachment mechanism further includes a first sealing washer between the second end and an inner wall of the diesel exhaust fluid tank, and a second sealing washer that abuts an outer wall of the diesel exhaust fluid tank.

15. The spindle assembly of claim 1, wherein the attachment mechanism includes a sliding locking tab.

16. The spindle assembly of claim 1, wherein the attachment mechanism includes an attachment body.

17. The spindle assembly of claim 16, wherein the attachment body is generally cylindrically shaped.

18. The spindle assembly of claim 16, wherein the attachment body is integrally formed on the spindle.

19. The spindle assembly of claim 16, wherein the attachment body mates with teeth on an inner surface of the tank.

20. A secondary heater assembly for a diesel exhaust fluid tank having a primary heater, the secondary heater assembly comprising:
   a heating wire; and
   a plurality of spindle assemblies, each of the plurality of spindle assemblies including
      a spindle having a first end and a second end opposite the first end, the first end and the second end defining a central axis therebetween, the spindle defining a plurality of grooves arranged between the first end and the second end;
      a retaining pin coupled to the spindle, the retaining pin extending generally parallel to the central axis, and
      an attachment mechanism coupled to the second end, the attachment mechanism configured to couple the spindle to an inner surface of the diesel exhaust fluid tank,
   wherein the heating wire is coupled to the plurality of spindle assemblies by securing at least a portion of the heating wire to each of the plurality of spindle assemblies between the retaining pin and the central axis.

* * * * *